United States Patent [19]

Sugawara

[11] Patent Number: 5,357,506
[45] Date of Patent: Oct. 18, 1994

[54] ATM SELF-ROUTING SWITCHING SYSTEM HAVING INPUT BUFFERS ADAPTIVELY CONTROLLED BY CONTENTION TEST RESULTS

[75] Inventor: Tsugio Sugawara, Tokyo, Japan
[73] Assignee: NEC Corporation, Tokyo, Japan
[21] Appl. No.: 990,002
[22] Filed: Dec. 14, 1992
[30] Foreign Application Priority Data
Dec. 13, 1991 [JP] Japan .................................. 3-330762
[51] Int. Cl.⁵ .......................................... H04Q 11/04
[52] U.S. Cl. .................................... 370/60; 370/85.2; 370/85.6; 370/94.1
[58] Field of Search ....................... 370/60, 94.1, 85.6, 370/85.2

[56] References Cited

U.S. PATENT DOCUMENTS

| | | | |
|---|---|---|---|
| 5,126,999 | 6/1992 | Munter et al. | 370/60 |
| 5,128,927 | 7/1992 | Killat et al. | 370/60 |
| 5,130,975 | 7/1992 | Akata | 370/60 |
| 5,130,984 | 7/1992 | Cisneros | 370/94.1 |
| 5,164,939 | 11/1992 | Shobatake | 370/60 |

OTHER PUBLICATIONS

K. Hayashi et al., "Evaluation of the Experimental ATM Switching System," Institute of Electronics, Information and Communications of Japan (SSE88-171), pp. 31-36.

Primary Examiner—Douglas W. Olms
Assistant Examiner—Russell W. Blum
Attorney, Agent, or Firm—Sughrue, Mion, Zinn, Macpeak & Seas

[57] ABSTRACT

In an input queuing self-routing switching system, each input buffer generates a reserve bit indicating that a cell of the buffer is a winner of a contention a previous contention cycle. A memory stores sets of path status bits and reads a corresponding set of path status bits for coupling to the input buffers as it receives cell destination addresses and reserve bits therefrom. Each path status bit indicates that a cell of the corresponding buffer is a contention loser if the reserve bit is not received during a subsequent contention cycle, or indicates that the cell is a winner of a contention when the reserve bit is received. Each input buffer is responsive to a contention timing signal for reading the destination address from a cell position identified by a cell pointer, and supplies the retrieved address and the reserve bit to the memory. The cell pointer of each buffer is shifted backwards when the corresponding path status bit indicates that the cell of the buffer is a contention loser and generates the reserve bit when the path status bit indicates that the cell is a contention winner. Each buffer further responds to a transmit timing signal for launching a cell therefrom to a self-routing network when that cell has been indicated as a contention winner by the path status bit.

4 Claims, 5 Drawing Sheets

Legend:
O = Contention winners
x = Contention losers

Legend:
● = Launched cells
× = Contention losers
○ = Contention winners
△ = To be launched next

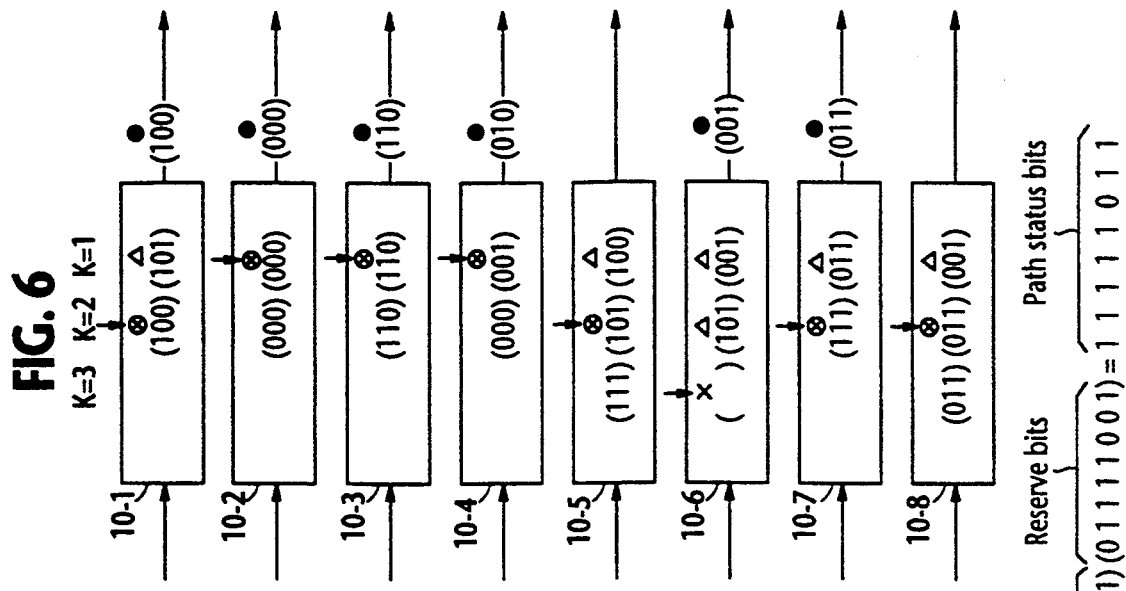
FIG. 6
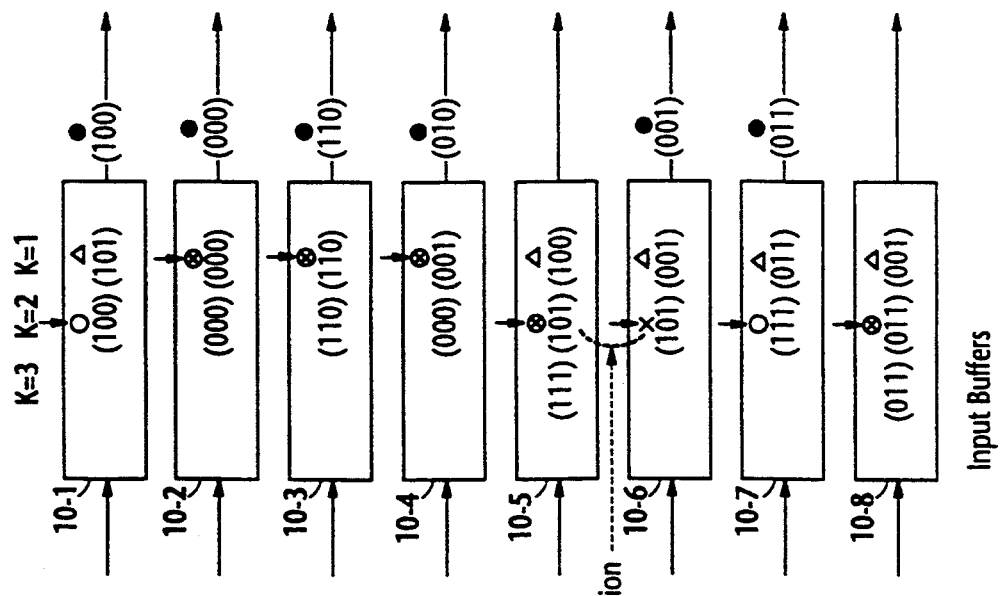
FIG. 5A
FIG. 5B
Legend:
● = Launched cells
× = Contention losers
⊗ = Reserved for contention
△ = To be launched next
○ = Contention winners

ATM SELF-ROUTING SWITCHING SYSTEM HAVING INPUT BUFFERS ADAPTIVELY CONTROLLED BY CONTENTION TEST RESULTS

BACKGROUND OF THE INVENTION

1. Field of the Invention

The present invention relates generally to asynchronous transfer mode (ATM) switching systems, and more specifically to an ATM self-routing switching system of the input buffer type.

2. Description of the Related Art

Batcher-Banyan network topology is well known in the ATM switching art. The Batcher network is a sorting network that precedes Banyan network to provide shuffling of cells destined to the same outlet. Another technique for resolving contention involves the use of a scheduling circuit that comprises comparators. Also known is an arbitration network proposed in a Japanese-language paper "Evaluation of the Experimental ATM Switching System", K. Hayashi et al, Institute of Electronics, Information and Communications of Japan, (SSE88-171).

However, the known techniques need complex contention detection circuitry where logic circuits are connected in multiple stages, delays are involved to detect contentions. A further shortcoming of the prior techniques is that priority is given in a fixed pattern, and hence, it is impossible to give priority impartially to all cells and adaptively in response to changing contention status.

SUMMARY OF THE INVENTION

It is therefore an object of the present invention to provide an ATM self-routing switching system which overcomes the prior art problems associated with input queuing ATM switches.

According to a first aspect of the present invention, there is provided a self-routing switching system comprising a non-blocking self-routing network having a plurality of inlets and a plurality of outlets for routing cells applied to any of the inlets to any of the outlets without causing a collision with other cells, each of the cells containing a destination address of the cell. A plurality of input buffers are provided corresponding respectively to the inlets of the network for receiving incoming cells. Each input buffer has a plurality of cell positions identified by a cell pointer. Contention detection means receives the destination addresses from the input buffers and, in response thereto, generates path status bits corresponding respectively to the buffers. Each path status bit indicates that a cell of the corresponding buffer is a loser of a contention when there is a match between the destination address of the cell of the corresponding buffer and the destination address of a cell of any other buffer or a winner of a contention when there is a mismatch between the destination address of the cell of the corresponding buffer and the destination address of a cell of any other buffer. Each input buffer reads a destination address from a cell position identified by the cell pointer thereof and supplies the retrieved address to the contention detection means, and launches a cell from the output end of the buffer into the network when the path status bit indicates the absence of contention and shifts the cell pointer in a direction away from the output end when the path status bit indicates the presence of a contention.

Preferably, the contention detection means comprises a memory in which a plurality of sets of the path status bits are stored. The memory receives the destination addresses from the input buffers as an address signal of the memory, and reads the stored path status bits and reading a corresponding set of path status bits.

According to a second aspect of the present invention, the self-routing switching system comprises a non-blocking self-routing network having a plurality of inlets and a plurality of outlets for routing cells applied to any of the inlets to any of the outlets without causing a collision with other cells, each of the cells containing a destination address of the cell. A timing controller generates a cell transmit timing signal to define a cell transmission cycle, and a contention timing signal at a rate higher than the rate of the cell transmit timing signal to define a plurality of contention cycles within the cell transmission cycle. Each input buffer generates a reserve bit indicating that a cell of the buffer is a winner of a contention during a previous contention cycle. Contention detection means receives the destination addresses and the reserve bits from the input buffers and, in response thereto, generates path status bits corresponding respectively to the buffers. Each of the path status bits indicates that a cell of the corresponding buffer is a loser of a contention when there is a match between the destination address of the cell of the corresponding buffer and the destination address of a cell of any other buffers if the reserve bit is not received from the corresponding buffer during a subsequent contention cycle, or indicates that the cell of the corresponding buffer is a winner of a contention when there is a mismatch between the destination address of the cell of the corresponding buffer and the destination address of any other cells or when the reserve bit is received from the corresponding buffer during the subsequent contention cycle. When the contention timing signal is received, each input buffer reads a destination address from a cell position identified by the cell pointer thereof and supplies the retrieved address and the reserve bit to the contention detection means, and shifts the cell pointer in a direction away from an output end of the buffer when the corresponding path status bit indicates that the cell of the buffer is a loser of a contention and generates a reserve bit when the corresponding path status bit indicates that the cell of the buffer is a winnner of a contention. Each buffer is further responsive to the cell transmit timing signal for launching a cell to the corresponding inlet of the network when the corresponding path status bit indicates that the cell of the buffer is a winner of a contention.

BRIEF DESCRIPTION OF THE DRAWINGS

The present invention will be described in further detail with reference to the accompanying drawings, in which:

FIG. 5A is a representation of cells in respective input buffers during a second contention cycle of the second cell cycle, and FIG. 5B is a representation of a sequence of input bits to the read-only memory during the second contention cycle, and resultant output bits; and FIG. 6 is a representation of cells in respective input buffers during a third contention cycle of the second cell cycle.

DETAILED DESCRIPTION

Figure 1:
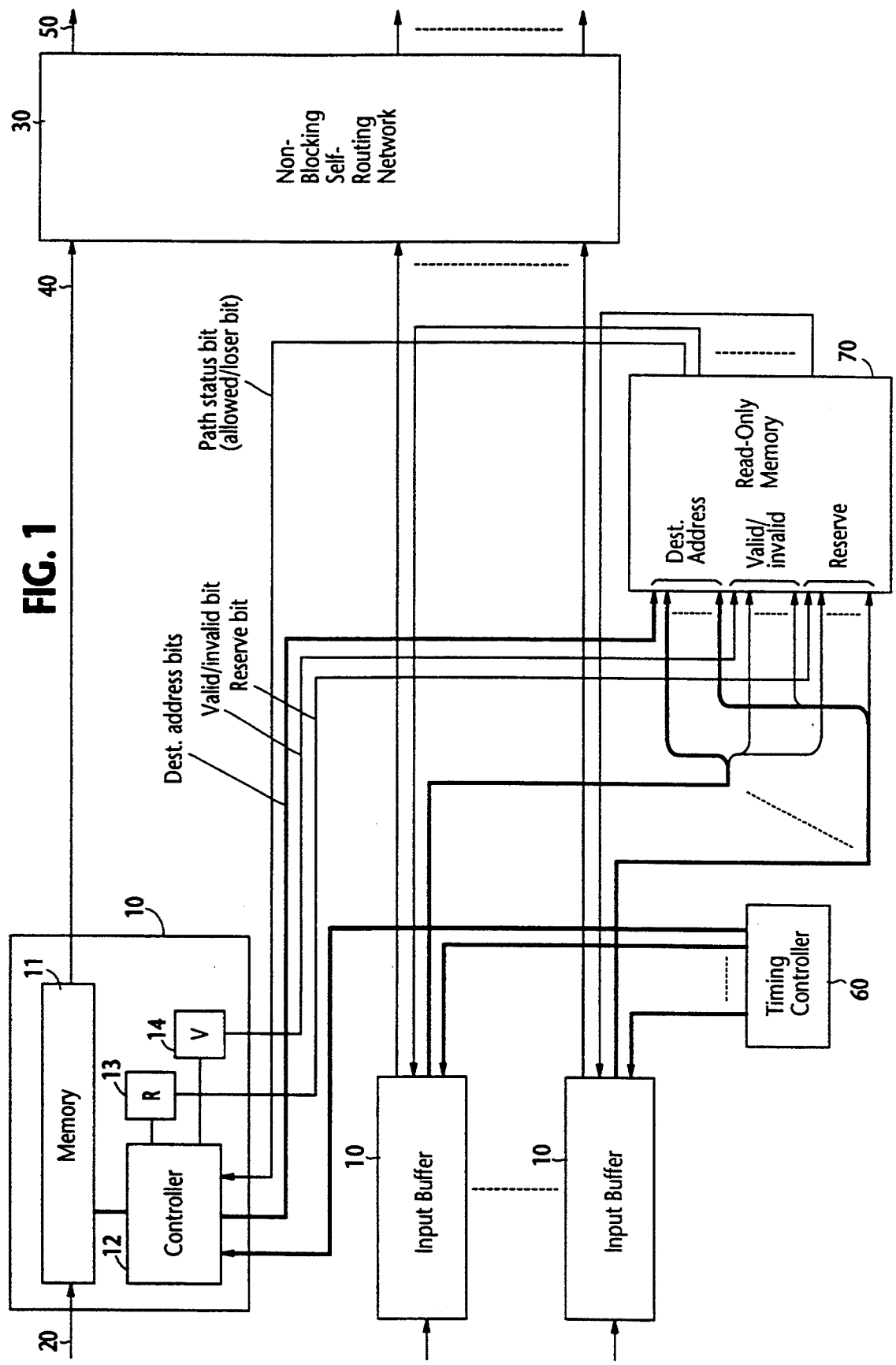
FIG. 1 is a block diagram of an ATM self-routing switching system according to the present invention.

Referring now to FIG. 1, there is shown an asynchronous transfer mode (ATM) self-routing switching system according to the present invention. The switching system of this invention comprises a plurality of input buffers 10, each receiving incoming ATM cells through an input transmission line 20. The output of each input buffer 10 is connected to a non-blocking self-routing network 30, such as Batcher-Banyan network, through an inlet 40. The network 30 has an array of outlets 50 corresponding in number to the inlets 40. A timing controller 60 is associated with all input buffers 10 to control their operations. Specifically, it produces a cell transmit timing pulse at periodic intervals and contention start timing pulses at a higher than the cell transmit timing pulse in order to enable each input buffer to perform a sequence of contention processes during each cell transmission cycle as will be described in detail later.

Further associated with the input buffers 10 is a read-only memory 70 which stores a plurality of sets of path status bits. A set of path status bits is read out of the memory 70 in response to a set of input data including cell address bits, a valid/invalid (or simply V-bit) bit and a reserve (R-bit) bit supplied from each input buffer 10. As will be described in detail later, the address bits of each buffer indicate the destination of a cell to be launched during the next cell transmit time, or cycle. The V-bit of each buffer indicates the presence (=1) or absence (=0) of such a cell in the output end of the buffer. The R-bit with 1 gives an indication that the cell identified by the cell address bits has been a contention winner during a previous contention cycle and is therefore reserved or given priority over possible contending cells and the R-bit with 0 indicates that the cell of interest is not given priority. The path status bits of each set correspond respectively to the input buffers 10, and the logic-1 of each path status bit indicates that a cell in the corresponding input buffer is a contention winner and the right to transmit is granted to that input buffer, and the logic-0 of the path status bit indicates that it is a contention loser and the right to transmit that cell is denied. If the V-bit is 1, the presence or absence of a contention is tested and the corresponding path status bit is either 1 or 0 according to the result of the test, and if it is 0, no contention test is made and the corresponding path status bit is set to 0.

Each input buffer 10 comprises a buffer memory 11 connected in the path from line 20 to the corresponding inlet 40 of the network. A controller 12 is connected to memory 11 to read cell address bits from a cell position indicated by a cell (read) pointer. R- and V-registers 13 and 14 are provided for storing an R-bit and a V-bit, respectively, supplied from controller 12. The cell address bits and the R- and V-bit stored in registers 13, 14 are supplied from each input buffer 10 as an address signal to the read-only memory 70 to read a path status bit corresponding to the input buffer.

Controller 12 of the input buffer 10 is a high-speed, hardwired sequence controller. For the purpose of disclosure, the logic functions of the sequence controller 12 are shown in the form of a flowchart in FIG. 2. Program execution starts with initialization step 201 that initializes a variable R to zero by storing a bit "0" into R-register 13, and initializes the cell pointer K of the associated memory 11 to 1. Exit then is to decision step 202 to check the timing control line from controller 60 to see if a contention start timing pulse is received. If the answer is affirmative, control branches at step 202 to decision step 203 to check to see if an ATM cell is stored in the position of memory 11 specified by the cell pointer K. If there is one, exit is to step 204 to set a variable V to 1 by storing a bit "1" into the V-register 14 and control proceeds to step 206. If no cell is present in the cell position K, control branches to step 205 to set the variable V to 0. At step 206, cell address bits are retrieved from the memory 11 specified by the cell pointer K. Control proceeds to step 207 to supply the retrieved address bits and the contents of the V- and R-register to ROM 70 as an address signal to read a corresponding path status bit which is either a contention winner bit or a contention loser bit.

If the path status bit is 1 indicating that a cell in the position K of buffer 11 is a contention winner, control branches at step 208 to step 209 to check the timing control line to see if a cell transmit timing pulse is received from the timing controller 60. If the answer is negative, control branches to step 210 to set the variable R to 1 and returns to step 202 to repeat the process during the next contention cycle. If the decision at step 209 is affirmative, control branches to step 211 to launch the ATM cell in the output-end of buffer 11 into the self-routing network 30, and control returns to initialization step 201.

If the path status bit is 0 indicating that a cell in the position K of buffer 11 is a contention loser or indicating that the V-bit of the buffer was 0 during the previous contention cycle, control branches to step 212 to determine whether there is a cell in the output end of the buffer. If the answer is negative, control returns to step 201. Otherwise, control proceeds to step 213 to increment the cell pointer K by one and returns to step 202.

Figure 2:
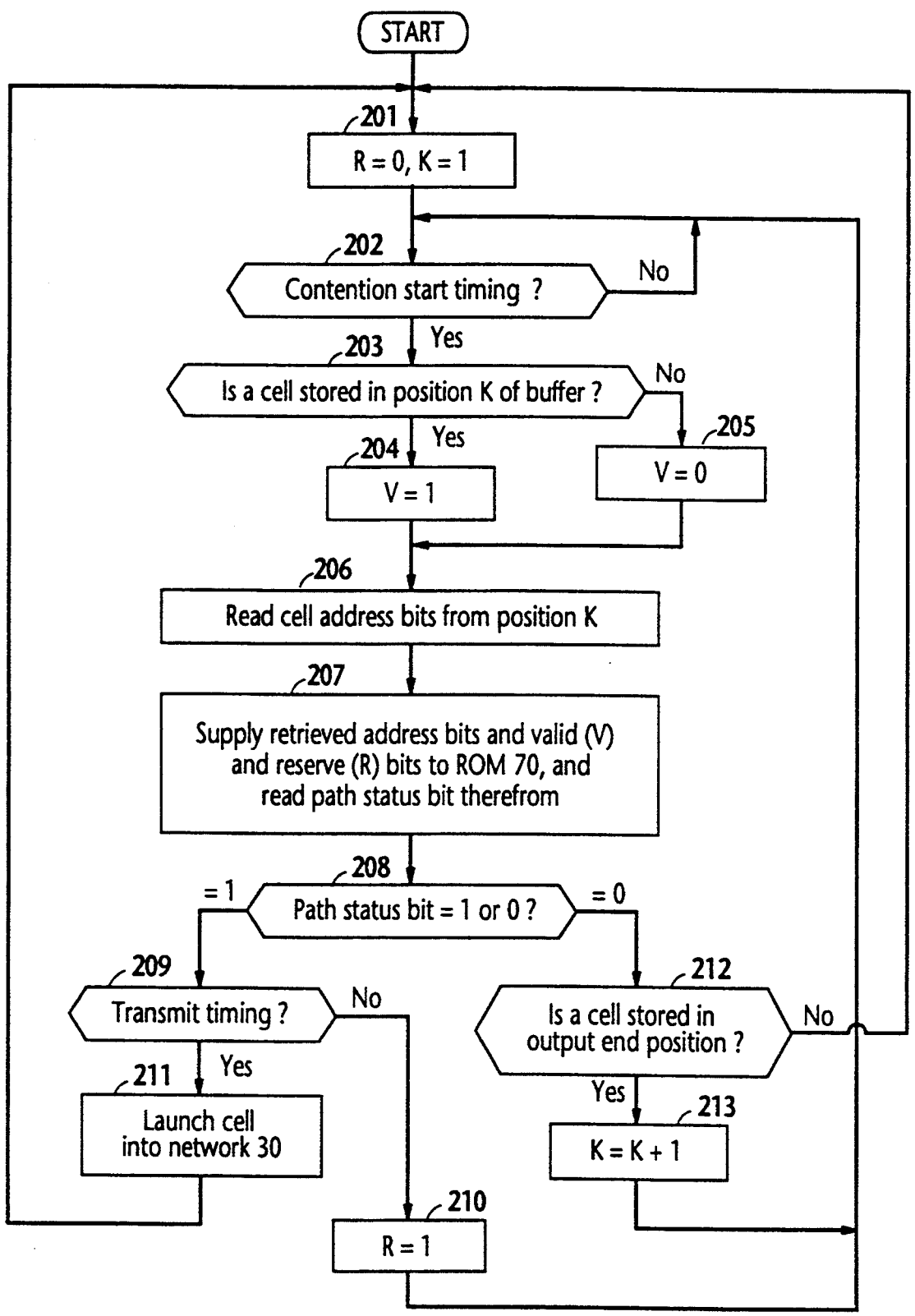
FIG. 2 is a flowchart of logic functions performed by the hardwired sequence controller of each input buffer.

The operation of the flowchart of FIG. 2 will be best understood with the following description.

Figures 3A, 3B:
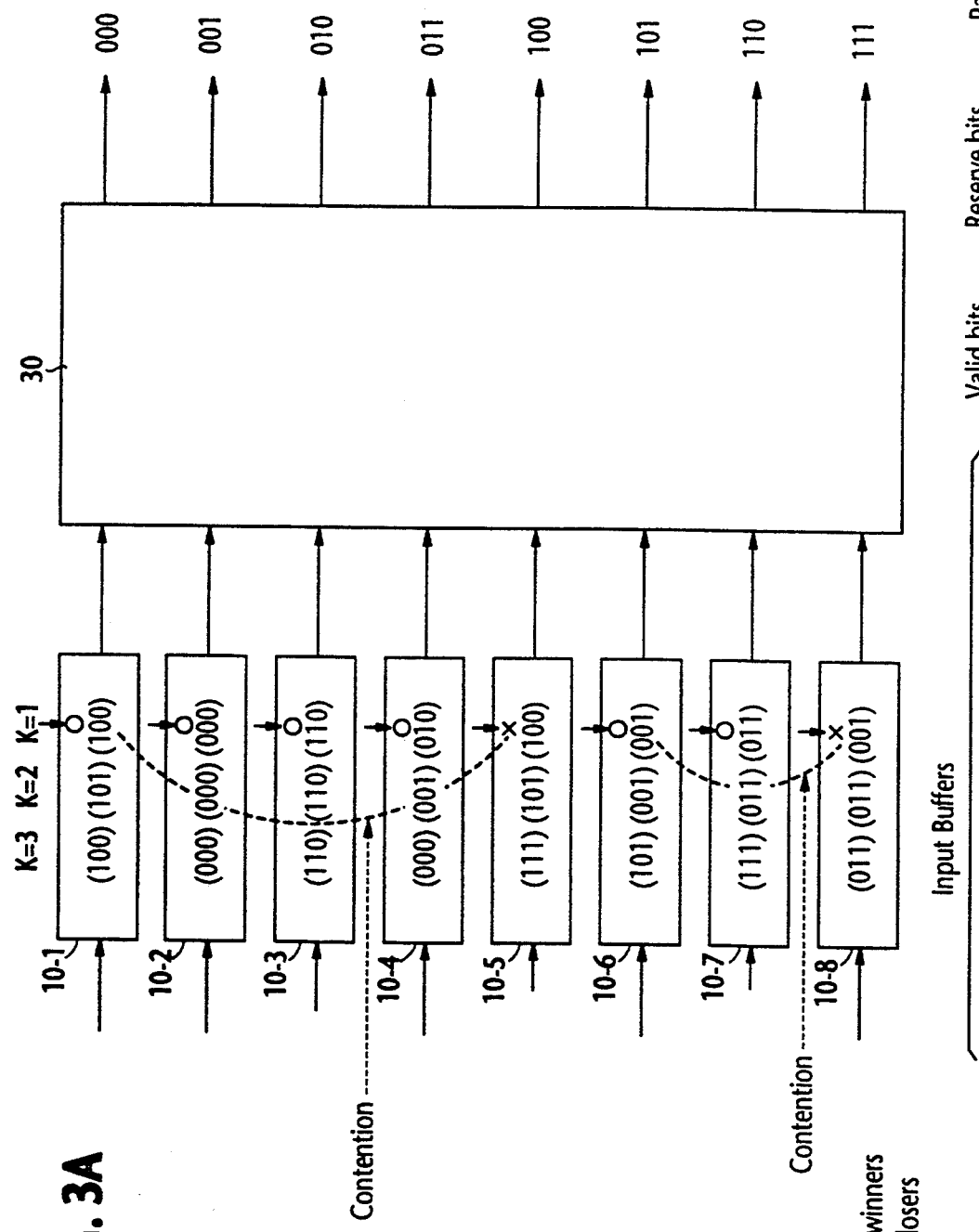
FIG. 3A is a schematic representation of cells in respective input buffers to be launched into the self-routing network during a first cell cycle.
FIG. 3B is a representation of a sequence of input bits applied to a read-only memory and a resultant sequence of output bits of the memory when the cells of FIG. 3A are just entered to the respective input buffers.

In FIG. 3A, assume that each input buffer is loaded with a sequence of three ATM cells, for example, each containing a three-bit destination address. For purposes of illustration, each buffer has cell positions K=1, K=2 and K=3 which are respectively filled by a three-bit address. In FIG. 3A and in succeeding figures, the downward pointing arrows indicate the cell where the controller 12 of each input buffer is processing. At the start of a first cell cycle, the R and K are set equal to R=0 and K=1. In response to a first contention start timing pulse of that first cell cycle issued from the timing controller 60, all controllers 12 branch at step 202 to step 203 to check for the presence of a cell in position K, i.e., K=1. With variable V being set equal to 1 (step 204), each controller 12 reads three-bit cell address from the memory 11 (step 206) and supplies the retrieved cell address bits, followed by V=1 and R=0 bits, to the ROM 70 to read a corresponding set of path status bits (step 207). Thus, as illustrated in FIG. 3B, the address input to ROM 70 during the first contention cycle of the first cell cycle is a series of bits as follows:

(100)(000)(110)(010)(100)(001)(011)(001)(11111111)(-00000000).

It is seen that two contentions occurred; one between the K=1 cells of input buffers 10-1 and 10-5, and the other between the K=1 cells of input buffers 10-6 and 10-8. The cells in the input buffers 10-1 and 10-6 are the winners and those in the input buffers 10-5 and 10-8 are the losers. Other cells in the input buffers 10-2~10-4 and 10-7 are winners without contentions. The path status bits are therefore given by a series of bits "11110110" representing respectively the winner/loser cells of buffers 10-1 through 10-8. Each controller 12 now moves to step 208 to determine whether the path status bit is 1 or 0. The controller 12 of each contention winning cell, i.e., the controllers of input buffers 10-1-10-4, 10-6 and 10-7 branch to step 208, while the controllers of the other input buffers branch to step 212. Since the transmit timing is not yet received from the controller 60, variable R is set to 1 (step 210) in the winning buffers, while the cell pointer K is incremented to K=2 in the losing buffers (step 213). Similar contention processes will be performed during successive contention cycles on the cell address bits which are stored in the K=2 positions of the losing buffers and on those stored in the same K=1 positions of the winning buffers as in the first contention cycle until the transmit timing pulse is received by the winning buffers, whereupon they launch their ATM cells into the self-routing network 30 (step 211).

Figures 4A, 4B:
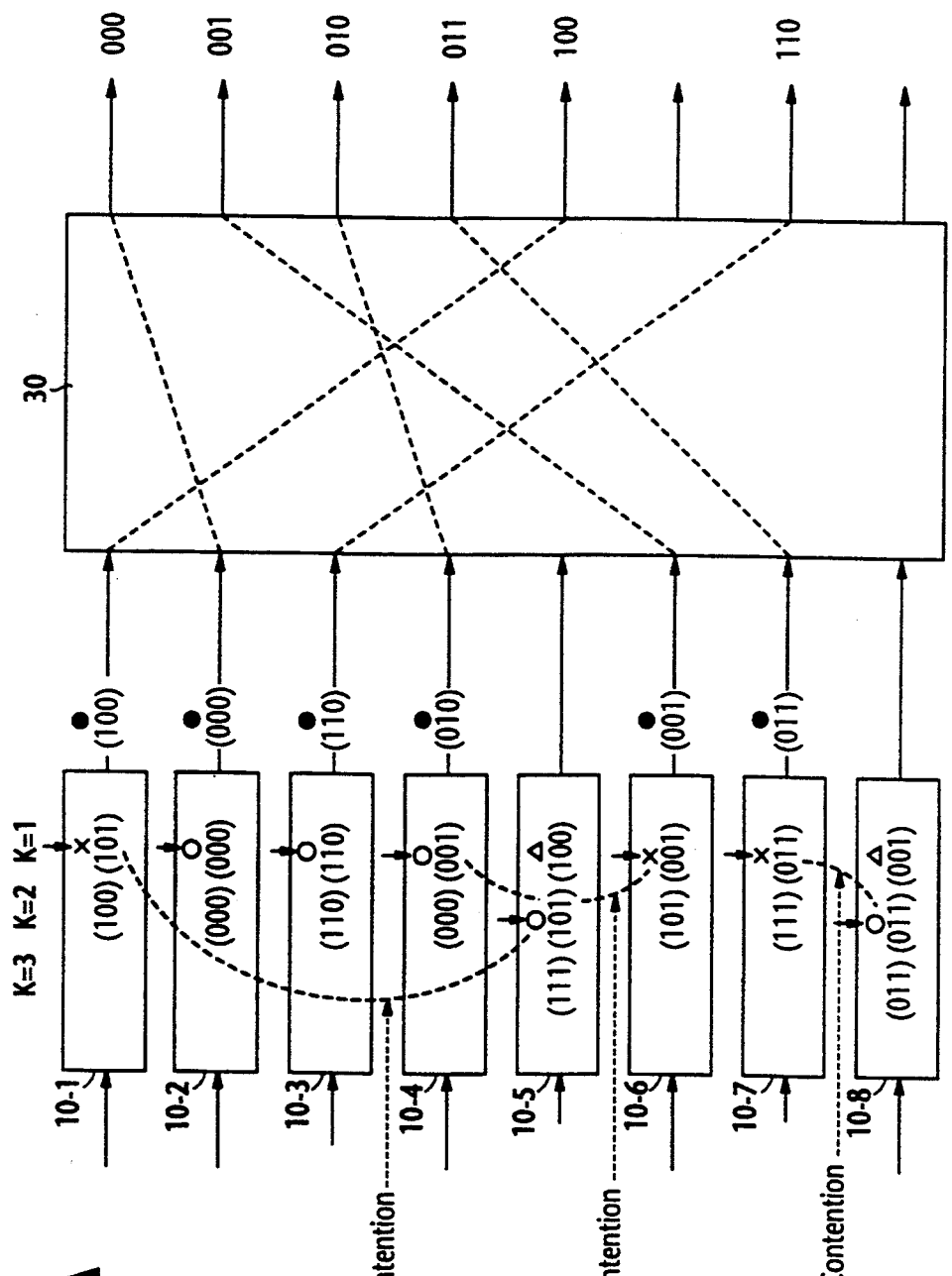
FIG. 4A is a representation of cells in respective input buffers during a first contention cycle of a second cell cycle.
FIG. 4B is a representation of a sequence of input bits to the read-only memory during the first contention cycle, and resultant output bits.

The following is a description of details of successive contention cycles of a second cell cycle that occurs immediately following the launching of cells "100", "000", "110", "010", "001" and "011" (which are marked with blank dots in FIG. 3A) from the respective input buffers 10 into the network 30 by reference to FIGS. 4A and 5A, in which the launched cells are marked with solid dots and the losing cells of the first cell cycle are marked with a triangle.

In the winning buffers from which the cells are just transmitted, the controller 12 starts their second cell cycle with step 201 by initializing variables R and K to 0 and 1, respectively, while the second cell cycle of the losing buffers starts with step 202 by checking for the presence of a first contention start timing pulse of the second cell cycle. Therefore, the cell pointer K of input buffers 10-1~10-4, 10-6 and 10-7 is 1, while the cell pointer K of input buffers 10-5 and 10-8 is shifted back to 2 as shown in FIG. 4A. As shown in FIG. 4B, the address input to ROM 70 during the first contention cycle of the second cell cycle is as follows:

(101)(000)(110)(001)(101)(001)(011)(011)(11111111)(-00000000).

Following receipt of the first contention start timing pulse, steps 203 to 208 are successively executed by all controllers 12 to read path status bits from ROM 70. Three contending situations occur, one between buffers 10-1 and 10-5, a second between buffers 10-4 and 10-6, and a third between buffers 10-7 and 10-8, and winners and losers of the contentions are determined by ROM 70 as indicated by the path status bits "01111001" (FIG. 4B), i.e., buffers 10-1, 10-6 and 10-7 are the losers of the contentions. In the contention winning buffers, control branches at step 208 to step 209 and sets the variable R to 1 and returns to step 202, while in the contention losing buffers, control branches at step 208 to step 212 to increment the cell pointer K by one and returns to step 202.

Therefore, the reserve bit of the winning buffers 10-2~10-5 and 10-8 is set to 1 while the reserve bit of the other buffers remains set to 0, producing a series of R bits "01111001". Thus, the cells in the K=1 positions of buffers 10-2–10-4 and the cells in the K=2 positions of buffers 10-5 and 10-8 are reserved, and the cell pointer of the losing buffers 10-1, 10-6 and 10-7 is shifted back to 2, while the cell pointer of the other buffers remains set to 1 as indicated in FIG. 5A just prior to the beginning of a second contention cycle. As shown in FIG. 5B, the address input to ROM 70 during the second contention cycle of the second cell cycle is as follows:

(100)(000)(110)(001)(101)(101)(111)(011)(11111111)(-01111001).

In response to a second contention start timing pulse, all input buffers successively execute steps 203 to 208 in the same manner as in the previous contention cycle to read path status bits. A contention occurs between buffers 10-5 and 10-6, and the winner and loser of the contention are determined by ROM 70 as indicated by the path status bits are "11111011" (FIG. 5B), i.e., buffer 10-5 is the winner and buffer 10-6 is the loser.

It is seen from FIGS. 3A, 4A and 5A, the loser cells of a first contention cycle (as marked by a symbol "x") are classified during a second contention cycle as candidates for transmission and marked with a triangle, and the winners of the first contention cycle are classified during the second contention cycle as reserved cells for contention and marked with a circle with a symbol "x". Therefore, during a third contention cycle, buffer 10-5 is the only buffer where the cell pointer is incremented to K=3 and a similar contention test is made in the ROM as shown in FIG. 6. Since the cells of the other buffers are all reserved, buffer 10-6 will become a loser if the cell in the K=3 position of buffer 10-6 encounters collision with any of the reserved cells.

A similar process will continue, and the candidate and reserved cells located in the output cell positions of all buffers 10 will then be launched into the network 30 when a transmit timing pulse is received.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A self-routing switching system comprising:
   a non-blocking self-routing network having a plurality of inlets and a plurality of outlest for routing cells applied to any of said inlets to any of said outlets without causing a collision with other cells, each of the cells containing a destination address of the cell;
   timing control means for generating a cell transmit timing signal to define a cell transmission cycle, and a contention timing signal at a rate higher than the rate of said cell transmit timing signal to define a plurality of contention cycles within the cell transmission cycle;

a plurality of input buffers for receiving incoming cells, said input buffers corresponding respectively to the inlets of said network, each of said buffers having a plurality of cell positions identified by a cell pointer and generating a reserve bit indicating that a cell of the buffer is a winner of a contention during a previous contention cycle; and contention detection means for receiving said destination addresses and said reserve bits from said input buffers and, in response thereto, generating path status bits corresponding respectively to said buffers, each of the path status bits indicating that a cell of the corresponding buffer is a loser of a contention when there is a match between the destination address of the cell of the corresponding buffer and the destination address of a cell of any other buffers if said reserve bit is not received from the corresponding buffer, or indicating that the cell of the corresponding buffer is a winner of a contention when there is a mismatch between the destination address of the cell of the corresponding buffer and the destination address of a cell of any other buffers or when said reserve bit is received from the corresponding buffer, each of said buffers being responsive to said contention timing signal for reading a destination address from a cell position identified by the cell pointer thereof and supplying the retrieved address and said reserve bit to said contention detection means, and shifting the cell pointer in a direction away from an output end of the buffer when the corresponding path status bit indicates that the cell of the buffer is a loser or a contention and generating said reserve bit when the corresponding path status bit indicates that the cell of the buffer is a winner of a contention, and being responsive to the cell transmit timing signal for launching a cell stored therein from said output end to the corresponding inlet of said network when the corresponding path status bit indicates that the cell of the buffer is a winner of a contention.

2. A self-routing switching system as claimed in claim 1, wherein said contention detection means comprises a memory storing a plurality of sets of said path status bits, receiving said destination addresses and said reserve bits from said input buffers as an address input of the memory and reading a corresponding set of stored path status bits.

3. A self-routing switching system comprising:

a non-blocking self-routing network having a plurality of inlets and a plurality of outlets for routing cells applied to any of said inlets to any of said outlets without causing a collision with other cells, each of the cells containing a destination address of the cell;

timing control means for generating a cell transmit timing signal to define a cell transmission cycle, and a contention timing signal at a rate higher than the rate of said cell transmit timing signal to define a plurality of contention cycles within the cell transmission cycle;

a plurality of input buffers for receiving incoming cells, said input buffers corresponding respectively to the inlets of said network, each of said buffers having a plurality of cell positions identified by a cell pointer and generating a valid bit indicating that there is a cell in the buffer, and a reserve bit indicating that a cell of the buffer is a winner of a contention during a previous contention cycle; and contention detection means for receiving said destination address, said valid/invalid bits and said reserve bits from said input buffers and, in response thereto, generating path status bits corresponding respectively to said buffers, each of the path status bits indicating that a cell of the corresponding buffer is a loser of contention when there is a match between the destination address of the cell of the corresponding buffer and the destination address of a cell of any other buffer if said valid bit and said reserve bit are not received from the corresponding buffer, or indicating that the cell of the corresponding buffer is a winner of a contention when there is a mismatch between the destination address of the cell of the corresponding buffer and the destination address of a cell of any other buffer or when said valid bit and said reserve bit are received from the corresponding buffer, each of said buffers being responsive to said contention timing signal for reading a destination address from a cell position identified by the cell pointer thereof, supplying the retrieved address, said valid bit and said reserve bit to said contention detection means, and shifting the cell pointer in a direction away from an output end of the buffer when the corresponding path status bit indicates that the cell of the buffer is a loser of a contention and generating said reserve bit when the corresponding path status bit indicates that the cell of the buffer is a winner of a contention, and being responsive to the cell transmit timing signal for launching a cell stored therein from said output end to the corresponding inlet of said network when the corresponding path status bit indicates that the cell of the buffer is a winner of a contention.

4. A self-routing switching system as claimed in claim 3, wherein said contention detection means comprises a memory storing a plurality of sets of said path status bits, receiving said destination addresses, said valid bits and said reserve bits from said input buffers as an address input of the memory and reading a corresponding set of stored path status bits.

* * * * *